(12) United States Patent
Lee (10) Patent No.: US 10,033,296 B1
(45) Date of Patent: Jul. 24, 2018

(54) RECTIFIER AND REGULATOR CIRCUIT

(71) Applicant: THE ALFRED E. MANN FOUNDATION FOR SCIENTIFIC RESEARCH, Santa Clarita, CA (US)

(72) Inventor: Edward K. F. Lee, Fullerton, CA (US)

(73) Assignee: The Alfred E. Mann Foundation for Scientific Research, Santa Clarita, CA (US)

( * ) Notice: Subject to any disclaimer, the term of this patent is extended or adjusted under 35 U.S.C. 154(b) by 0 days.

(21) Appl. No.: 15/255,010

(22) Filed: Sep. 1, 2016

Related U.S. Application Data (60) Provisional application No. 62/212,823, filed on Sep. 1, 2015.

(51) Int. Cl.
   H02M 3/155 (2006.01)
   H02M 7/217 (2006.01)
   H02M 1/32 (2007.01)

(52) U.S. Cl.
   CPC .............. *H02M 7/217* (2013.01); *H02M 1/32* (2013.01)

(58) Field of Classification Search
   CPC ...... H02M 3/156; H02M 3/155; H02M 3/157; H02M 3/158; H02M 3/1584; G05F 1/56; G05F 1/575; G05F 1/468; G05F 1/565; G05F 7/562
   USPC .............. 323/271–276, 282–285; 363/52, 53
   See application file for complete search history.

(56) References Cited

U.S. PATENT DOCUMENTS

| | | | | |
|---|---|---|---|---|
| 6,487,100 | B2 * | 11/2002 | Watanabe | G06K 19/0701 363/127 |
| 6,831,378 | B2 * | 12/2004 | Watanabe | G06K 19/0701 307/149 |
| 7,738,272 | B2 | 6/2010 | Klapf et al. | |
| 9,608,537 | B1 * | 3/2017 | Lee | H02M 7/217 |
| 2009/0141518 | A1 | 6/2009 | Klapf et al. | |
| 2010/0308919 | A1 * | 12/2010 | Adamski | G05F 1/56 330/291 |
| 2016/0227614 | A1 * | 8/2016 | Lissoni | H05B 33/0815 |

OTHER PUBLICATIONS

Lee, Edward K.F., "A Voltage Doubling Passive Rectifier/Regulator Circuit for Biomedical Implants," Alfred Mann Foundation, undated, 4 pages.
Hashemi, S. Saeid et al., "A High-Efficiency Low-Voltage CMOS Rectifier for Harvesting Energy in Implantable Devices," IEEE Transactions on Biomedical Circuits and Systems, vol. 6, No. 4, Aug. 2012, 10 pages.

* cited by examiner

*Primary Examiner* — Adolf Berhane
(74) *Attorney, Agent, or Firm* — Lewis Roca Rothgerber Christie LLP (57) ABSTRACT

Systems and methods for rectifying and regulating an input voltage are disclosed. A biasing circuit is configured to generate a biasing voltage greater than the maximum value of the input voltage minus a forward bias voltage of a p-n junction diode and apply the biasing voltage to the body terminal of a MOSFET. The biasing circuit may generate the biasing voltage by rectifying the input voltage. A control circuit is configured to generate a gate voltage based on the rectified and regulated output voltage and apply the gate voltage to the gate terminal of the MOSFET.

22 Claims, 10 Drawing Sheets

RECTIFIER AND REGULATOR CIRCUIT

CROSS-REFERENCE TO RELATED APPLICATION(S)

This application claims priority to and the benefit of U.S. provisional patent application No. 62/212,823, filed on Sep. 1, 2015, the entire disclosure of which is incorporated herein by reference.

BACKGROUND

Power management is an important aspect in the design of a biomedical implant. Inductive coupling is the most common method for delivering power wirelessly to implants from an external controller outside the body. The external controller usually includes (e.g., consists of) a coil driver driving a primary coil, which is inductively coupled to a secondary coil inside the implant. The received AC power on the secondary coil can be used to supply different implant circuits directly or for recharging a battery inside the implant. In most implant designs, the received AC power on the implanted coil is first converted to an unregulated DC voltage using a rectifier, and then regulated to a desired DC level using a regulator.

The frequency for delivering the AC power is at times selected to be 13.56 MHz or some other value. In some applications, high DC supply voltages (sometimes higher than the peak AC voltage on the implanted coil) are required for implant circuits such as electrical stimulators.

Accordingly, it may be desirable to provide a system and method for rectifying and regulating received AC power with reduced or minimal loss, it may be desirable to do so at high input frequencies, and it may be desirable to do so while providing a high output voltage, such as an output voltage higher than the peak-to-peak AC power.

SUMMARY

In one aspect of the current disclosure, a method of rectifying and regulating an input voltage using a metal-oxide-semiconductor field-effect transistor (MOSFET) is provided. The method includes the steps of receiving an input voltage; generating a biasing voltage, the biasing voltage being higher than a maximum value of the input voltage minus a forward bias voltage of a p-n junction diode; applying the biasing voltage to the body terminal of the MOSFET; applying the input voltage to the first terminal of the MOSFET; and regulating transfer of current from the first terminal of the MOSFET to the second terminal of the MOSFET.

In one embodiment, regulating transfer of current from the first terminal to the second terminal includes allowing current to flow between the first terminal and the second terminal when the input voltage is greater than the voltage at the second terminal and the input voltage is greater than the voltage at the gate terminal plus a threshold voltage of the MOSFET.

In one embodiment, regulating transfer of current from the first terminal to the second terminal includes controlling the voltage at the gate terminal such that the voltage at the second terminal corresponds with a reference voltage.

In one embodiment, the controlling of the voltage at the gate terminal includes providing the voltage at the second terminal of the MOSFET to a non-inverting input of an error amplifier, providing the reference voltage to an inverting input of the error amplifier, and providing an output of the error amplifier to the gate terminal of the MOSFET.

In one embodiment, the controlling of the voltage at the gate terminal includes preventing the voltage at the gate terminal from decreasing if the voltage at the second terminal is lower than the voltage at the gate terminal minus a threshold voltage of the MOSFET.

In one embodiment, the biasing voltage is generated from the input voltage.

In one embodiment, generating the biasing voltage includes rectifying the input voltage.

In one embodiment, the rectifying is performed utilizing a rectifier with a voltage drop lower than the forward bias voltage of a p-n junction diode.

In one embodiment, the rectifying is performed utilizing a Schottky diode.

In one embodiment, the rectifying is performed utilizing a diode-connected NMOS transistor.

In one embodiment, the generating of the biasing voltage includes utilizing the input voltage as the biasing voltage when the input voltage is greater than the voltage at the second terminal, and utilizing the voltage at the second terminal as the biasing voltage when the voltage at the second terminal is greater than the input voltage.

In another aspect of the present disclosure, a system for rectifying and regulating an input voltage is provided. The system includes a metal-oxide-semiconductor field-effect transistor (MOSFET) having a first terminal, a second terminal, a gate terminal, and a body terminal; a biasing circuit coupled to the first terminal and to the body terminal, the biasing circuit being configured to generate a biasing voltage greater than the maximum value of the voltage on the first terminal minus a forward bias voltage of a p-n junction diode and apply the biasing voltage to the body terminal; and a control circuit coupled to the gate terminal and the second terminal, the control circuit being configured to generate a gate voltage based on a voltage at the second terminal, and apply the gate voltage to the gate terminal to regulate transfer of current by the MOSFET from the first terminal to the second terminal.

In one embodiment, the control circuit generates the gate voltage such that current flows between the first terminal and the second terminal when the voltage at the first terminal is greater than the voltage at the second terminal and the voltage at the first terminal is greater than the voltage at the gate terminal plus a threshold voltage of the MOSFET.

In one embodiment, generating the gate voltage based on the voltage at the second terminal is generating the gate voltage such that the voltage at the second terminal has a DC value.

In one embodiment, the control circuit includes an error amplifier, a non-inverting input of the error amplifier is coupled to the second terminal of the MOSFET, an inverting input of the error amplifier is coupled to a reference voltage, and an output of the error amplifier is coupled to the gate terminal of the MOSFET.

In one embodiment, the control circuit includes an overdrive protection transistor, a gate terminal of the overdrive protection transistor being coupled to the gate terminal of the MOSFET, a first terminal of the overdrive protection transistor being coupled to the second terminal of the MOSFET, and a second terminal of the overdrive protection transistor being coupled to the error amplifier such that if the overdrive protection transistor conducts an overdrive protection current to the error amplifier, the error amplifier will prevent the gate voltage from decreasing.

In one embodiment, the biasing circuit is an auxiliary rectifier configured to rectify the voltage at the first terminal.

In one embodiment, the auxiliary rectifier includes a Schottky diode.

In one embodiment, the auxiliary rectifier includes a diode-connected NMOS transistor.

In one embodiment, the biasing circuit is further coupled to the second terminal of the MOSFET, and wherein the biasing circuit is further configured to apply the higher of the voltage at the first terminal and the voltage at the second terminal to the body terminal.

These and other aspects and features of the present disclosure will be more fully understood when considered with respect to the following detailed description, appended claims, and accompanying drawings. Of course, the actual scope of the invention is defined by the appended claims.

DETAILED DESCRIPTION

Hereinafter, example embodiments will be described in more detail with reference to the accompanying drawings. The present inventive concept, however, may be embodied in various different forms, and should not be construed as being limited to only the illustrated embodiments herein. Rather, these embodiments are provided as examples so that this disclosure will be thorough and complete, and will fully convey the aspects and features of the inventive concept to those skilled in the art. Accordingly, processes, elements, and techniques that are not necessary to those having ordinary skill in the art for a complete understanding of the aspects and features of the inventive concept may not be described. Unless otherwise noted, like reference numerals denote like elements throughout the attached drawings and the written description, and thus, descriptions thereof may not be repeated.

Descriptions of features or aspects within each exemplary embodiment should typically be considered as available for other similar features or aspects in other exemplary embodiments.

Figure 1:
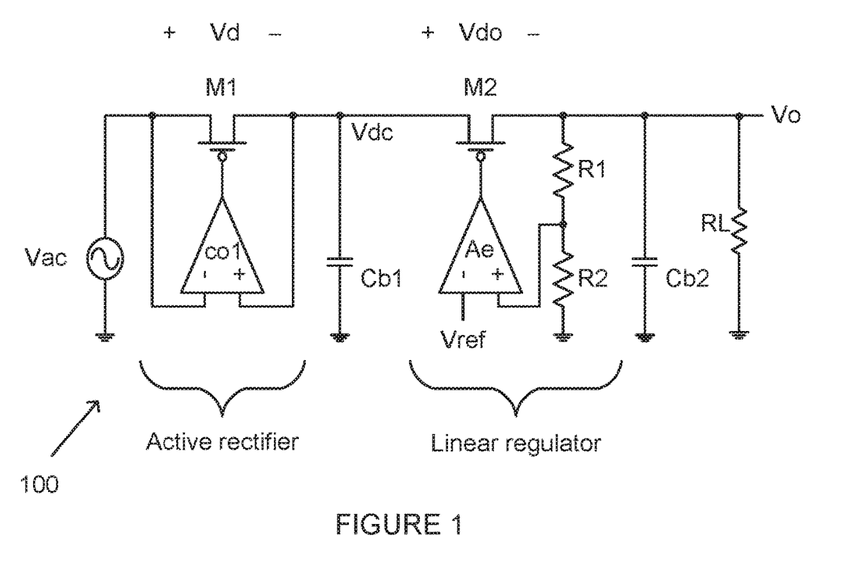
FIG. 1 is a circuit diagram of a rectifier and regulator circuit according to a related art.

FIG. 1 is a circuit diagram of a rectifier and regulator circuit 100 according to a related art. It includes an active rectifier in series with a linear regulator. The active rectifier includes comparator CO1 and transistor M1. The linear regulator includes error amplifier Ae, transistor M2, resistor R1, and resistor R2.

When the input AC voltage Vac is higher than the unregulated DC voltage Vdc, CO1 will turn on M1. Hence, Vdc would ideally be charged to a value equal to the peak voltage of Vac given as Vacp. However, due to the on-resistance of M1 and the current flow through M1 as well as the delay of CO1, the maximum Vdc is Vd lower than Vacp (for example, Vd may be between 0.2V and 0.7V). The regulated output Vo is obtained by regulating the current flow on M2 using an error amplifier Ae, which adjusts the gate voltage of M2 until Vo measured through the voltage divider of R1 and R2 is equal to the input reference voltage Vref. However, a minimum voltage drop (dropout voltage) Vdo (for example, Vdo may be in the range of 0.2V to 0.4V) between Vdc and Vo is required by the linear regulator. As a result, for a desired Vo, the minimum peak voltage requirement for Vac, min[Vacp], is equal to Vo+Vdo+Vd. The voltage conversion ratio Rv is defined as Vo/min[Vacp] (for example, Rv for a conventional rectifier may be in the range of 0.7 to 0.92. If Vdo of the regulator is included, Rv may be dropped to the range of 0.65 to 0.8.) Furthermore, the overall maximum power efficiency, ηp, defined as the power dissipated on RL (PL) divided by the input power (Pin) from Vac at min[Vacp] may be, for example, in the range of 65% to 80% due mainly to the power dissipations on both M1 and M2.

Figure 2:
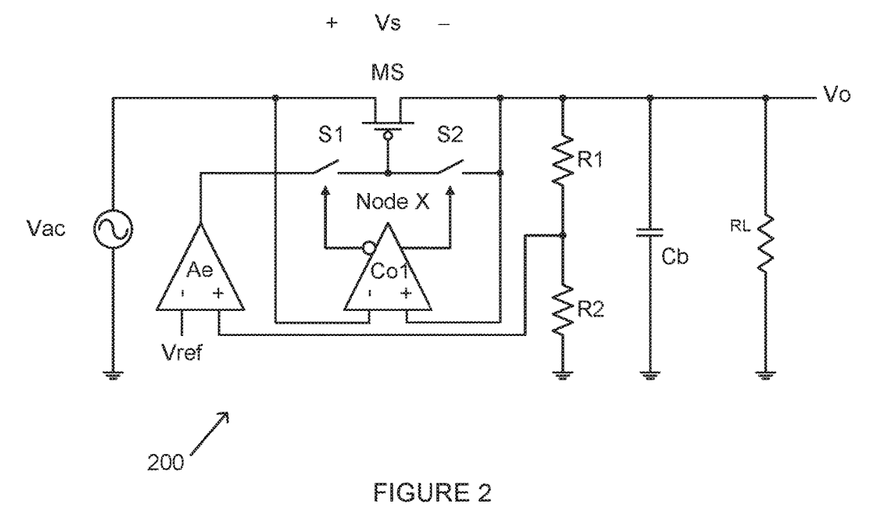
FIG. 2 is a circuit diagram of a rectifier and regulator circuit according to a related art.

FIG. 2 is a circuit diagram of a rectifier and regulator circuit 200 according to a related art. The circuit 200 includes a transistor MS coupled between Vac and Vo. The gate of transistor MS is coupled to a first switch S1 and a second switch S2. A comparator CO1 controls the switches S1 and S2, such that one and only one of the two switches is open at any given time. The comparator CO1 takes Vac and Vo as inputs. The first switch S1 couples the output of an error amplifier Ae to the gate of the transistor MS. The error amplifier receives a reference voltage Vref at its inverted input and Vo measured through the voltage divider of R1 and R2 at its non-inverted input. The second switch S2 couples Vo to the gate of the transistor MS. If Vac>Vo, CO1 will turn on switch S1 and turn off switch S2, allowing amplifier Ae to control the gate voltage of the main transistor MS such that Vo is regulated to the desired output voltage given as (1+R1/R2)·Vref. If Vac<Vo, CO1 will turn off the first switch S1 and turn on the second switch S2 such that MS is turned off with no current flow between Vac and Vo. Since only one transistor is between Vac and Vo, most of the power dissipates on transistor MS and the voltage drop between Vac and Vo given as Vs is only one source-to-drain voltage drop. Hence, both Rv and ηp can be improved over the circuit 100 of FIG. 1. However, the response time of CO1 has limitations, and may cause ηp to start to degrade when the frequency fac of the input AC voltage Vac increases beyond a certain level, for example over 10 MHz.

Figure 3:
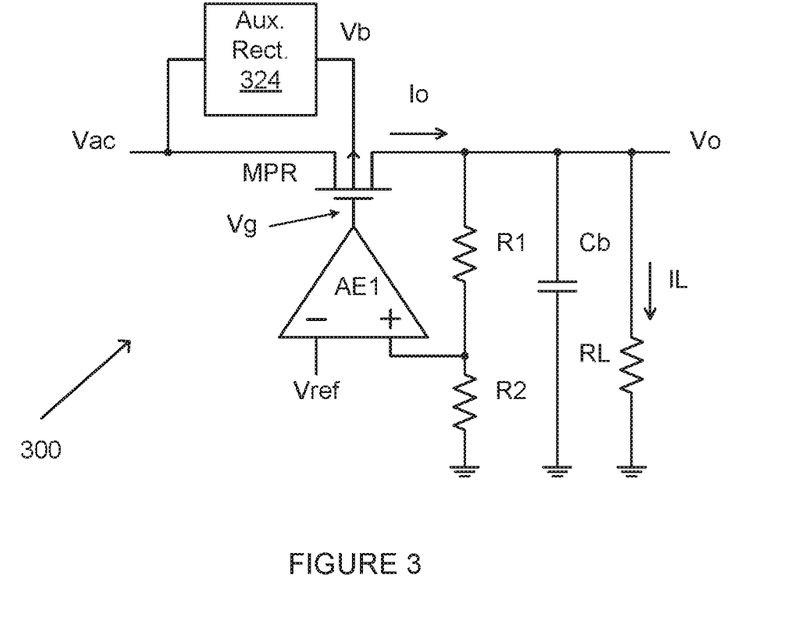
FIG. 3 is a circuit diagram of a rectifier and regulator circuit according to an embodiment of the present disclosure.

FIG. 3 is a circuit diagram of a rectifier and regulator circuit 300 according to an embodiment of the present disclosure.

The circuit 300 includes a transistor MPR, an error amplifier AE1, a voltage divider including first resistor R1 and second resistor R2, an auxiliary rectifier 324, and a capacitor Cb. The transistor MPR is coupled between an input node and an output node. The input node receives an input voltage Vac. The voltage at the output node is the output voltage Vo. The current passing from the input node to the output node through the transistor MPR is the output current Io. The capacitor Cb is connected between the output node and ground. The voltage divider including resistor R1 and resistor R2 is coupled between the output node and ground. The non-inverting input of the error amplifier AE1 is coupled to the node between resistors R1 and R2. The inverting input of the error amplifier AE1 is coupled to a reference voltage Vref. The error amplifier AE1 outputs a gate voltage Vg which is coupled to the gate of the transistor MPR. The auxiliary rectifier 324 rectifies the input voltage Vac to create a biasing voltage Vb and couples the biasing voltage Vb to the body terminal of the transistor MPR. In some embodiments, because the current drawn from Vb by the body terminal of the transistor MPR is relatively small, the ηp of the auxiliary rectifier has negligible contributions on the overall ηp of the circuit 300. In some embodiments, the error amplifier AE1 receives Vb as its supply voltage.

For Vac>Vo and Vac>Vg+|Vtp| where |Vtp| is the absolute value of the threshold voltage of the transistor MPR, the terminals connected to Vac, Vg and Vo become the source, gate and drain terminals of the transistor MPR, respectively. Since, for the PMOS transistor MPR, the source-to-gate voltage is higher than |Vtp| and the source voltage is higher than the drain voltage, output current Io is greater than zero and charges the capacitor Cb, thereby replenishing the current IL drawn by the load RL. For Vac<Vo and Vo−Vg<|Vtp|, the terminals connected to Vac, Vg and Vo become the drain, gate and source terminals of the transistor MPR, respectively. Since the source-to-gate voltage of the transistor MPR is less than |Vtp|, the transistor MRP is off and the output current Io will be zero. As a result, rectification of the input signal Vac is achieved using transistor MPR with its body terminal biased to a voltage higher than Vac and Vo minus a forward bias voltage of a p-n junction diode. Nevertheless, the output voltage Vo is smoothed out by the capacitor Cb so Vo remains relatively or substantially constant in spite of the current IL drawn by the load RL.

The output voltage Vo is then coupled to the error amplifier AE1 through the voltage divider including resistors R1 and R2 such that the average output voltage Vo times R2/(R1+R2) is compared with the reference voltage Vref using the error amplifier AE1. Since the error amplifier AE1 together with the transistor MPR and the voltage divider (R1 and R2) forms a negative feedback loop, the error amplifier AE1 will set the gate voltage Vg to a relatively constant value such that the voltage difference between the average output voltage Vo times R2/(R1+R2) and the reference voltage Vref becomes very small for the error amplifier AE1 having a high voltage gain. In other words, the average Vo times R2/(R1+R2) will be approximately equal to Vref and hence, the average Vo is equal to Vref×(1+R1/R2). Accordingly, the output voltage Vo (or the average of the output voltage Vo) will be regulated to a DC value corresponding to the reference voltage Vref.

For Vac<Vo, the transistor MPR should be off (Io=0) if Vo−Vg<|Vtp|. This condition is satisfied if the error amplifier AE1 does not overdrive MPR into the triode region (i.e. Vg is too low such that Vo−Vg>|Vtp|). In some embodiments, the error amplifier AE1 is required to limit the range of Vg when the overdriving of the transistor MPR is detected. This is discussed further below, in reference to the error amplifier At of FIG. 7.

Figure 4:
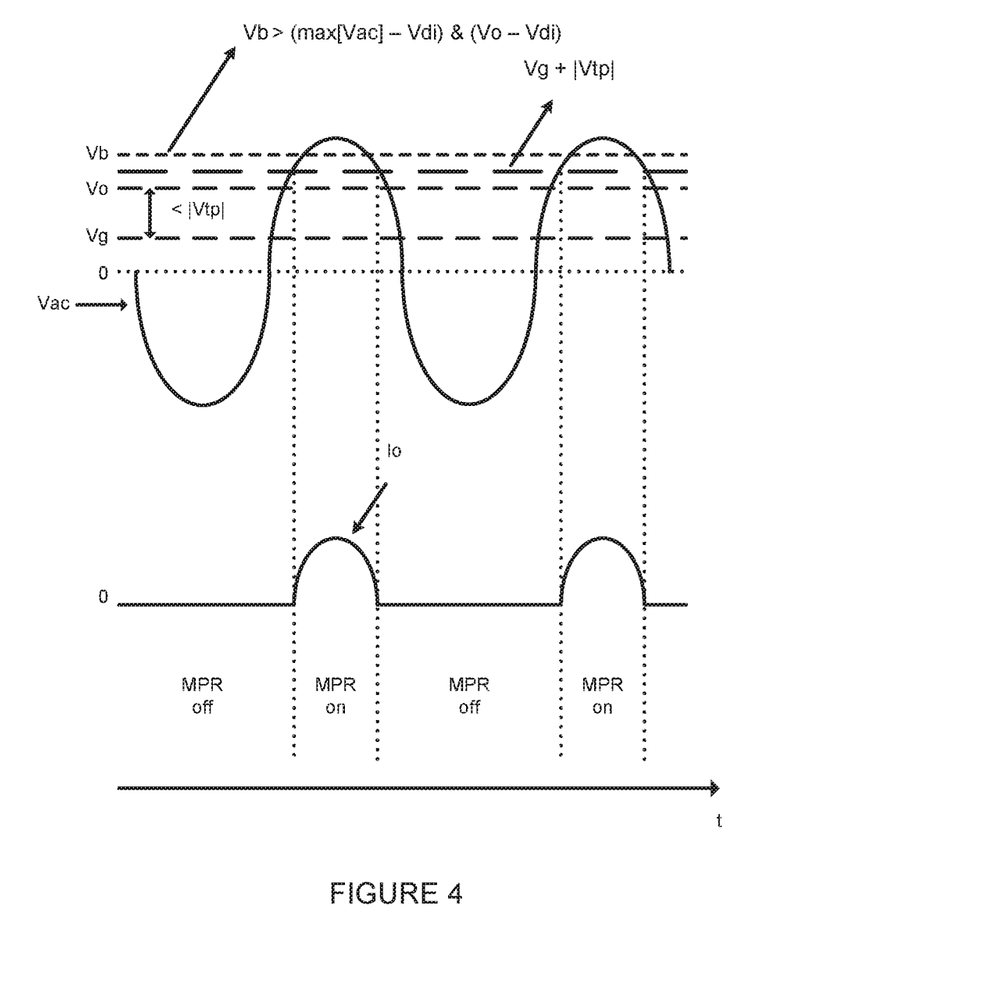
FIG. 4 is a timing diagram demonstrating operation of circuits according to embodiments of the present disclosure.

FIG. 4 is a timing diagram demonstrating operation of circuits according to embodiments of the present disclosure.

The output voltage Vo is less than Vg+|Vtp|. The gate voltage Vg and the output voltage Vo remain relatively constant during normal operation of the circuit. Accordingly, the output voltage Vo does not overcome the threshold voltage of the transistor MPR from the output side during normal operation of the circuit, so the transistor MPR will not allow current to flow from the output node to the input node.

Initially, the transistor MPR is off. The input voltage Vac is less than Vg+|Vtp|, so it does not overcome the threshold voltage of the transistor MPR from the input node. Once the input voltage Vac increases to be greater than Vg+|Vtp|, it is sufficient to overcome the threshold voltage of the transistor MPR, and the transistor MPR turns on, conducting the output current Io from the input node to the output node. Note, when Vac is greater than Vg+|Vtp|, it is necessarily greater than Vo because Vo is less than Vg+|Vtp|.

Transistor MPR has a first parasitic diode between the terminal connected to the input node and the body terminal, a second parasitic diode between the terminal connected to the output node and the body terminal, a first parasitic bipolar transistor between the input-connected terminal, the body terminal, and the ground terminal, and a second parasitic bipolar transistor between the output-connected terminal, the body terminal, and the ground terminal. Under certain circumstances, large undesired currents can flow through these parasitic diodes and the parasitic transistors.

Current may flow through the second parasitic diode between the output-connected terminal and the body terminal if the body terminal voltage is one p-n junction diode forward-bias voltage (hereinafter 'diode drop Vdi') lower than Vo. For example, if the body terminal of transistor MPR is directly connected to the input node, current can flow back from the output node to the input node through the second parasitic diode when Vac is one diode drop Vdi lower than Vo. The current through the second parasitic diode may also trigger the second parasitic bipolar transistor associated with transistor MPR such that latchup may occur and a larger undesired current can flow from Vo to ground.

Current may flow through the first parasitic diode between the input-connected terminal and the body terminal if the body terminal voltage is one diode drop Vdi lower than Vac. For example, if the body terminal of transistor MPR is connected to the output node, large current can flow from Vac to Vo through the first parasitic diode when Vac is one diode voltage drop higher than Vo. This current is not controlled by the gate voltage of transistor MPR. Furthermore, the current flow on the first parasitic diode may also trigger the first parasitic bipolar transistor associated with transistor MPR such that latchup can occur and a larger undesired current can flow from Vac to ground.

Accordingly, in the embodiment of FIG. 3, auxiliary rectifier 324 generates biasing voltage Vb greater than the maximum value of the input voltage Vac (max[Vac]) minus one diode drop Vdi. Vb is applied to the body terminal of the transistor MPR. Accordingly, because max[Vac]−Vdi<Vb, no value of Vac will cause current to flow through the first parasitic diode. Additionally, the output voltage Vo cannot be higher than max[Vac], so it necessarily follows that Vo−Vdi<Vb. Accordingly, no current will flow through the second parasitic diode. To accomplish this, the voltage drop for the auxiliary rectifier 324 should be lower than a diode drop Vdi.

Figure 5A:
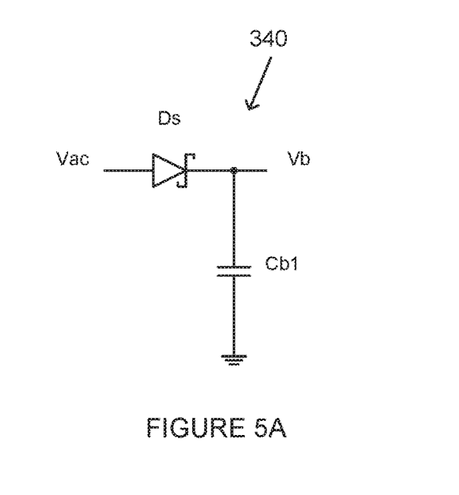
FIG. 5A is a circuit diagram of one embodiment of an auxiliary rectifier according to embodiments of the present disclosure.

FIG. 5A is a circuit diagram of one embodiment of an auxiliary rectifier according to embodiments of the present disclosure. The auxiliary rectifier 340 includes a Schottky diode Ds and a capacitor Cb1 coupled between the cathode of the Schottky diode Ds and ground. The Schottky diode Ds receives the input voltage Vac at its anode and outputs a rectified version of the input voltage Vac at its cathode, thereby charging the capacitor Cb1 to the biasing voltage Vb. The biasing voltage Vb will be max[Vac] minus the Schottky diode forward bias voltage Vdis. The Schottky diode Ds is configured such that its forward bias voltage Vdis is less that the forward bias voltage for a p-n junction diode Vdi. Accordingly, Vb will be greater than max[Vac]−Vdi.

Figure 5B:
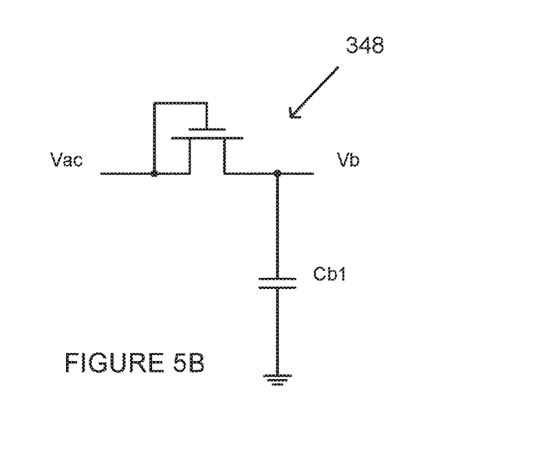
FIG. 5B is a circuit diagram of another embodiment of an auxiliary rectifier according to embodiments of the present disclosure.

FIG. 5B is a circuit diagram of another embodiment of an auxiliary rectifier according to embodiments of the present disclosure. The auxiliary rectifier 348 includes an NMOS transistor and a capacitor Cb1. The auxiliary rectifier 348 functions substantially similarly to the auxiliary rectifier 340 of FIG. 5A, with the NMOS transistor REF being diode connected and performing the same role as the Schottky diode Ds. The biasing voltage Vb will be max[Vac] minus the NMOS transistor threshold voltage. The NMOS transistor is configured such that its threshold voltage is less than a diode drop Vdi. In some embodiments, the threshold voltage is less than approximately (about) 0.45V. Accordingly, Vb will be greater than max[Vac]−Vdi.

Figure 5C:
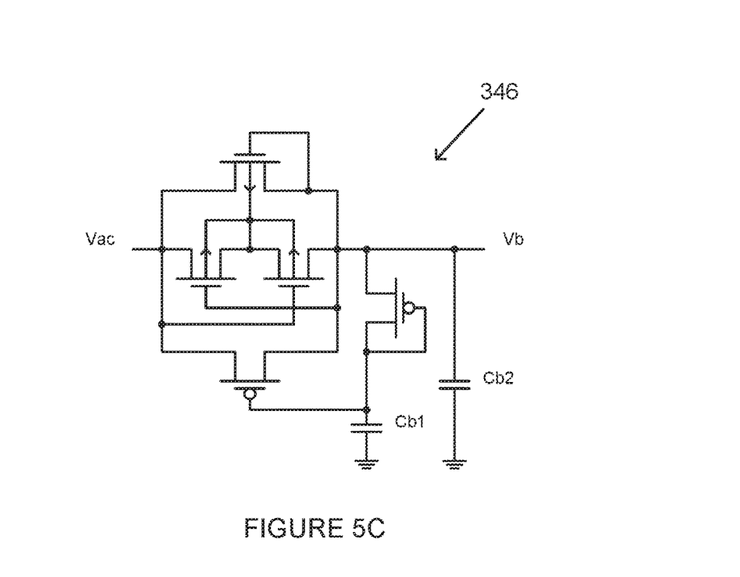
FIG. 5C is a circuit diagram of another embodiment of an auxiliary rectifier according to embodiments of the present disclosure.

FIG. 5C is a circuit diagram of another embodiment of an auxiliary rectifier according to embodiments of the present disclosure. The auxiliary rectifier 346 is coupled to the input node to receive the input voltage Vac as its input, and outputs the biasing voltage Vb. In some embodiments, the auxiliary rectifier 346 may function as described in Hashemi et al., A High-Efficiency Low-Voltage CMOS Rectifier for Harvesting Energy in Implantable Devices, IEEE Transactions on Biomedical Circuits and Systems, Vol. 6, No 4, August 2012, the entire content of which is hereby incorporated by reference. This auxiliary rectifier 346 may provide a biasing voltage Vb which is greater than max[Vac]−Vdi.

Figure 6:
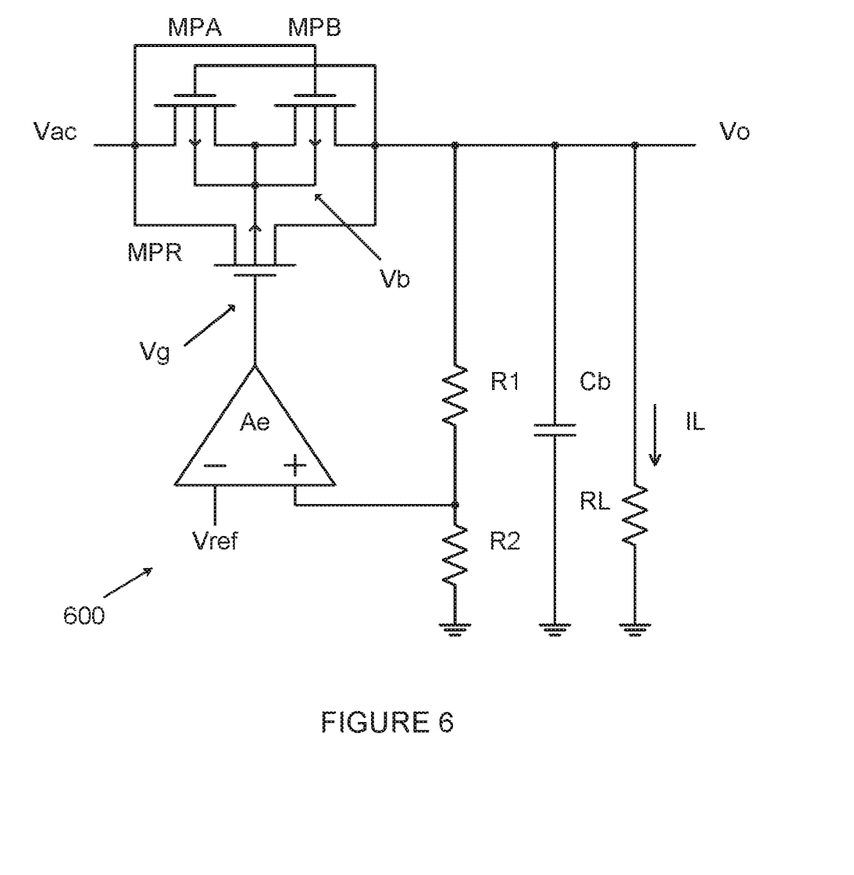
FIG. 6 is a circuit diagram of a rectifier and regulator circuit according to another embodiment of the present disclosure.

FIG. 6 is a circuit diagram of a rectifier and regulator circuit according to another embodiment of the present disclosure.

In some embodiments, the circuit 600 of FIG. 6 includes an Error amplifier AE1, a voltage divider including resistors R1 and R2, a capacitor Cb1, and a transistor MPR which are substantially the same as those of the embodiment of FIG. 3. Accordingly, like reference numerals will be used and operation of those elements, where it is the same, will not be repeated.

The circuit 600 also includes transistors MPA and MPB. The first terminal of MPA is coupled to the input node. The second terminal of MPA is coupled to a first terminal of MPB. The second terminal of MPB is coupled to the output node. The gate terminal of MPA is coupled to the output node. The gate terminal of MPB is coupled to the input node. The body terminals of MPA, MPB, and MPR are all coupled to the second terminal of MPA and the first terminal of MPB. The threshold voltages for the transistors MPA and MPB |Vthab| are less than a diode drop Vdi.

When Vac>Vo+|Vthab|, transistor MPA is turned on and transistor MPB is off. Hence, transistor MPA connects Vb to Vac. Although Vb=Vac is not a constant voltage, it is higher than the value of Vac minus one diode drop Vdi and higher than Vo minus one diode drop Vdi during the period where Vac>Vo+|Vthab|. As a result, the parasitic diodes and parasitic bipolar transistors associated with the transistor MPR will not turn on.

When Vac<Vo−|Vthab|, transistor MPB is turned on and transistor MPA is off. Hence, transistor MPB connects Vb to Vo. Vb=Vo is also higher than the value of Vac minus one diode drop Vdi and higher than Vo minus one diode drop Vdi during the period where Vac<Vo−|Vthab|. As a result, the parasitic diodes and parasitic bipolar transistors associated with the transistor MPR will not turn on.

For the case Vo−|Vthab|<Vac<Vo+|Vthab|, Vb will be within the range between Vo−|Vthab| and Vo+|Vthab|. The voltages across the parasitic diodes associated with the transistor MPR will be less than a diode drop Vdi. Hence, the currents flowing through the parasitic diodes are negligible and no undesirable effects will result.

Figure 7:
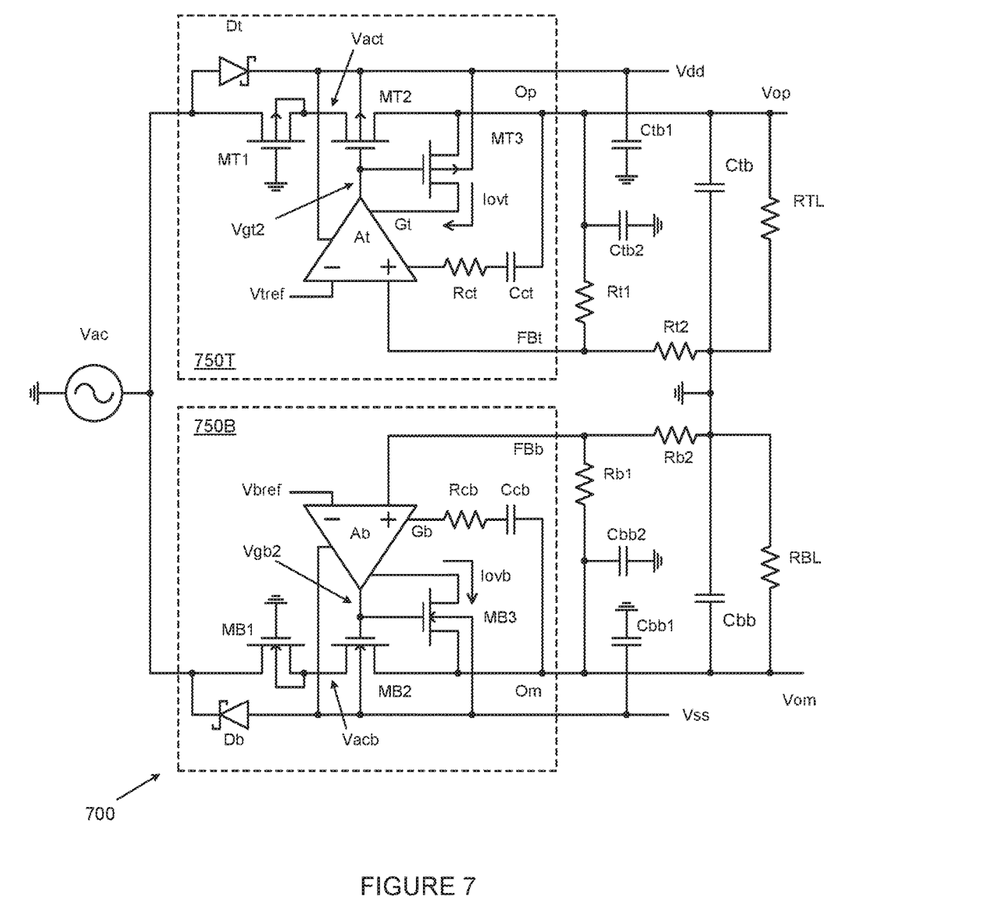
FIG. 7 is a circuit diagram of a full-wave rectifier and regulator circuit according to an embodiment of the present disclosure.

FIG. 7 is a circuit diagram of a full-wave rectifier and regulator circuit according to an embodiment of the present disclosure. The circuit of FIG. 7 includes a p-regulator-rectifier circuit (hereinafter 'p-circuit') 750T and an n-regulator-rectifier circuit (hereinafter 'n-circuit') 750B. The p-circuit 750T rectifies and regulates the input signal Vac to generate a positive output voltage Vop. The n-circuit 750B rectifies and regulates the input signal Vac to generate a negative output voltage Vom. The total output voltage, Voc is equal to Vop−Vom.

As one having ordinary skill in the art would recognize that the p-circuit and the n-circuit function in a similar manner but with opposite polarities. Accordingly, the p-circuit 750T will be primarily discussed.

The p-circuit 750T includes a transistor MT2, an error amplifier At, a voltage divider including first resistor Rt1 and second resistor Rt2, a capacitor Ctb, and an auxiliary rectifier. The auxiliary rectifier includes a Schottky diode Dt and a capacitor Ctb1. The transistor MT2 is coupled between an input node and an output node. The input node receives an input voltage Vac. The voltage at the output node is the positive output voltage Vop. The capacitor Ctb is connected between the output node and ground. The voltage divider including resistor Rt1 and resistor Rt2 is coupled between the output node and ground. The non-inverting input of the error amplifier At is coupled to the node between resistors Rt1 and Rt2. The inverting input of the error amplifier At is coupled to a reference voltage Vtref. The error amplifier At outputs a gate voltage Vgt2 which is coupled to the gate of the transistor MT2. The Schottky diode Dt rectifies the input voltage Vac and applies the rectified voltage to charge the capacitor Ctb1 to generate a biasing voltage Vdd. In some embodiments, the biasing voltage Vdd is applied the the error amplifier At as the supply voltage.

In some embodiments, the p-circuit 750T further includes the transistor MT1. The source terminal of transistor MT1 is coupled to the transistor MT2, and the drain terminal is coupled to the input voltage Vac. The body terminal of transistor MT1 is coupled to its source terminal, and the gate terminal is grounded. Transistor MT1 allows the p-circuit 750T to receive a higher amplitude Vac without exceeding the maximum drain-to-source voltage of the transistor MT2. For the positive cycle of Vac, MT1 is on with its source voltage, Vact, following Vac. For the negative cycle of Vac, MT1 is off. Vact will stay at about (~) 0V. As a result, the swings of the source-to-drain voltages of both transistor MT1 and transistor MT2 may be less than the swing of the peak-to-peak value of Vac. For example, the swings of the source-to-drain voltages of both transistor MT1 and transistor MT2 may be half of the swing of the peak-to-peak value of Vac.

In some embodiments, the p-circuit 750T further includes the transistor MT3. The gate terminal of transistor MT3 is coupled to the gate terminal of transistor MT2. The body terminal of transistor MT3 is coupled to the body terminal of transistor MT2. Transistor MT3 is coupled between the output node and the error amplifier At.

Figure 8:
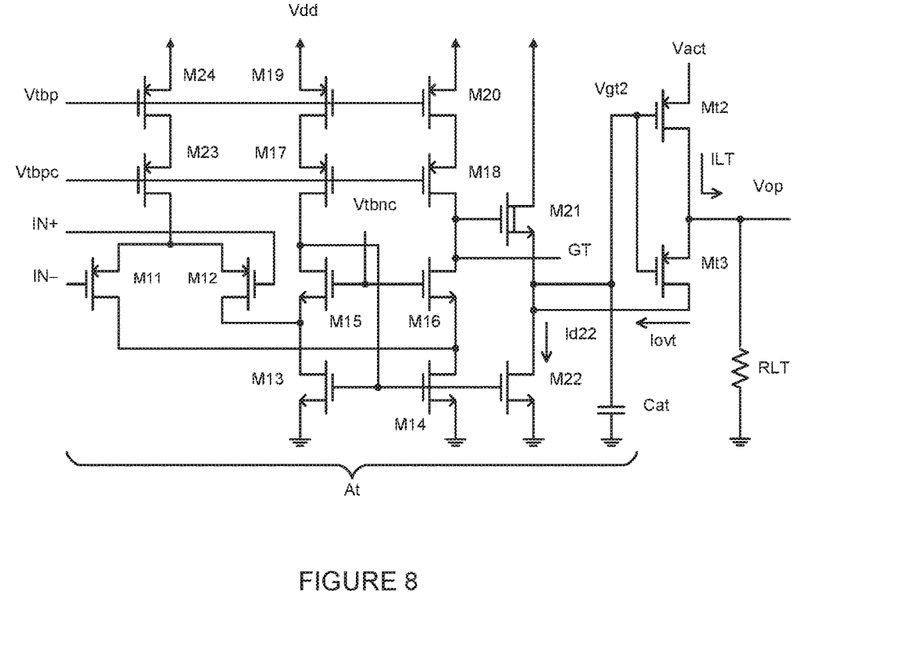
FIG. 8 is a circuit diagram of an embodiment of error amplifier At, transistor MT2, and transistor MT3 of FIG. 7.

The transistor MT3 may be used to detect when MT2 is overdriven. When MT2 is overdriven, Vgt2 is less than Vop−|Vtp|. Hence, MT3 will turn on and conduct a current of Iovt, which is used in At to prevent MT3 from being overdriven. FIG. 8 is a circuit diagram of an embodiment of error amplifier At, transistor MT2, and transistor MT3. Error amplifier At consists of a high gain folded-cascode input stage (M11-M20) and a low impedance source follower stage (M21-M22) that drives the output transistor MT2. In some embodiments, a capacitor Cat may be coupled between Vgt2 and ground, thereby keeping Vgt2 relatively stable. In some embodiments, the overall frequency response is compensated by Rct and Cct shown in FIG. 7. In some embodiments, transistor M21 is a native NMOS. It allows error amplifier At to have sufficient output swing to drive Vgt2 close to Vdd under low IL conditions. If transistor MT2 is overdriven with Vgt2<Vop−|Vtp| in overdriven situations discussed above, transistor MT3 will conduct a non-zero current Iovt that has a maximum value equal to the drain current of transistor M22 (Id22). In this case, transistor M21 will be off and error amplifier At will not continue to drive Vgt2 below about (~) (Vop−|Vtp|). In some embodiments, to keep transistor MT2 from being overdriven, the width-length ratio of transistor MT3 is selected to be relatively large such that transistor MT3 is in sub-threshold region to have its source-to-gate voltage less than |Vtp| for Iovt=Id22.

Figure 9:
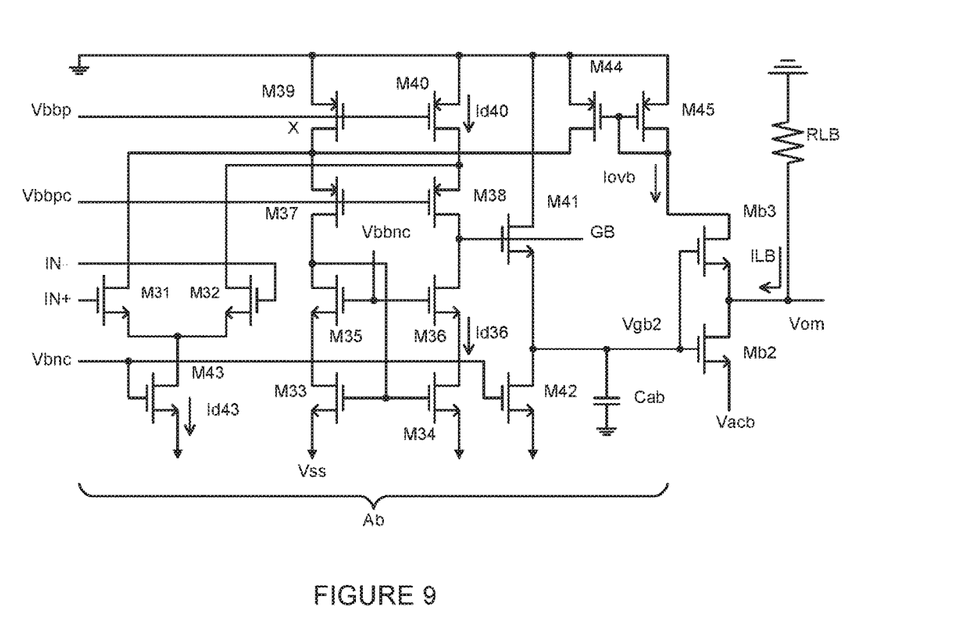
FIG. 9 is a circuit diagram of an embodiment of error amplifier Ab, transistor MB2, and transistor MB3 of FIG. 7.

FIG. 9 is a circuit diagram of an embodiment of error amplifier Ab, transistor MB2, and transistor MB3 of the n-circuit 750B of FIG. 7. In some embodiments, in n-circuit 750B, transistor MB3 is used for detecting when transistor MB2 is overdriven in the same manner as discussed regarding transistors MT3 and MT2 above. Unlike the case in error amplifier At, however, in error amplifier Ab, the current Iovb cannot be used directly to turn off transistor M41 in the source follower stage. Instead, the current Iovb is mirrored to node X in the input stage such that when Iovb is equal to Id43, the output of the input stage and hence, the gate voltage of transistor MB2, Vgb2, will not increase further.

Figure 10:
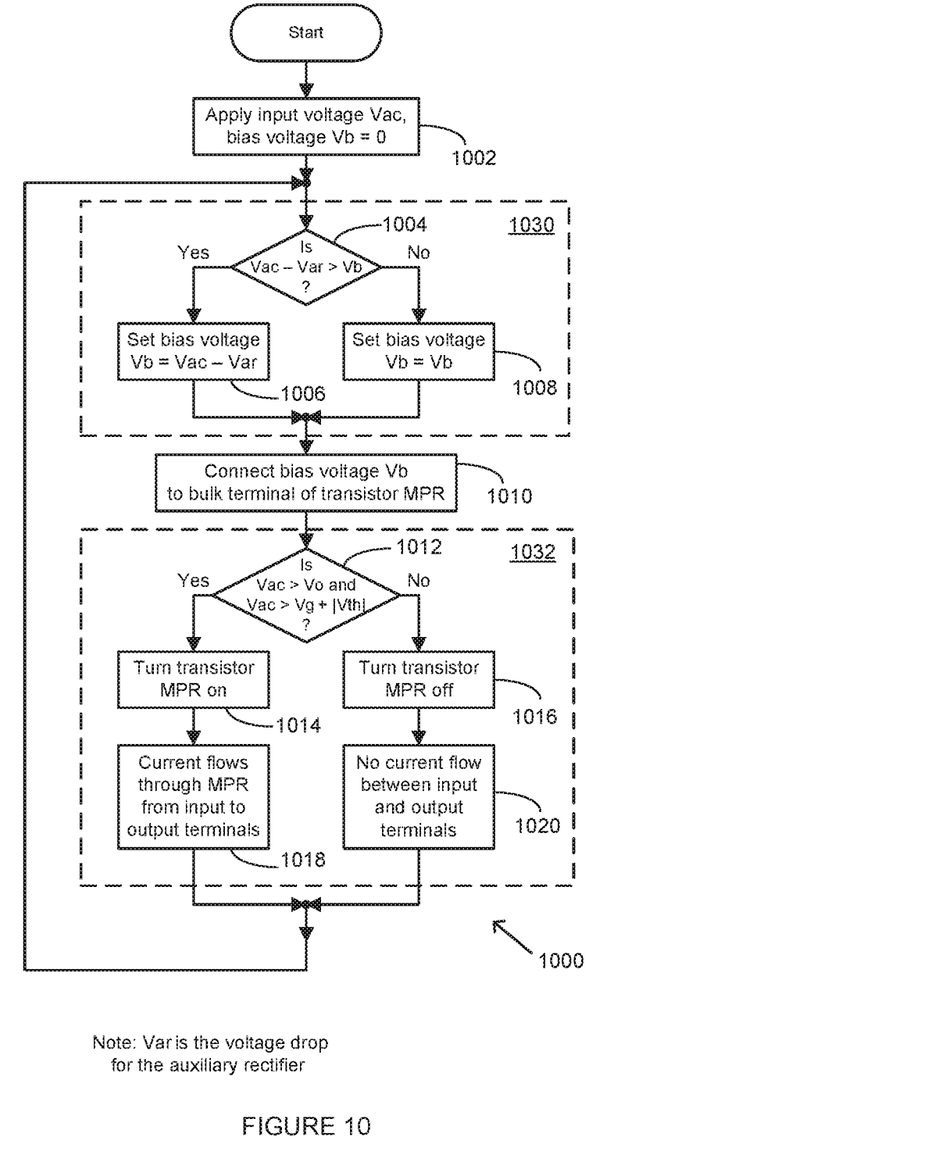
FIG. 10 is a flow chart of a method of rectifying and regulating a voltage according to embodiments of the present disclosure.

FIG. 10 is a flow chart of a method of rectifying and regulating a voltage according to embodiments of the present disclosure. The method 1000 may be used, for example, to rectify and regulate an input voltage Vac using a transistor MPR, such that the transistor MPR receives the input voltage Vac at a first terminal and outputs a rectified and regulated output voltage Vo at a second terminal.

At act 1002, an input voltage Vac is received. In some embodiments, Vac is an AC voltage. In some embodiments, a biasing voltage Vb may initially be zero. In some embodiments, the input voltage Vac is applied to the first terminal of the transistor MPR. In some embodiments, the transistor MPR is a metal-oxide-semiconductor field-effect transistor (MOSFET). In some embodiments, the transistor MPR is PMOS.

At act 1030, a biasing voltage Vb is generated. The biasing voltage Vb may be higher than the maximum value of the input voltage max[Vac] minus a diode drop Vdi.

In one embodiment, an auxiliary rectifier is used to generate the biasing voltage Vb by rectifying the input voltage Vac. The auxiliary rectifier may, for example, have a voltage drop lower than a diode drop Vdi. In one embodiment, rectification is performed utilizing a Schottky diode. In another embodiment, rectification is performed utilizing a diode-connected NMOS transistor.

In some embodiments, at act 1004, it is determined whether the input voltage Vac minus the voltage drop for the auxiliary rectifier Var is greater than the current value of the biasing voltage Vb. If not, then at act 1008 the biasing voltage Vb is maintained at its current value (for example, no current flows from the node containing the input voltage Vac through the auxiliary rectifier to the node containing the biasing voltage Vb). If the input voltage Vac minus the voltage drop for the auxiliary rectifier Var is greater than the current value of the biasing voltage Vb, then at act 1006 the biasing voltage Vb is set to be the input voltage Vac minus the voltage drop for the auxiliary rectifier Var (for example, the input voltage Vac is rectified by the auxiliary rectifier to provide a biasing voltage Vb equal to the input voltage Vac minus the voltage drop for the auxiliary rectifier Var).

In another embodiment, at act 1030, the biasing voltage Vb is generated by comparing the input voltage Vac to the output voltage Vo. If the input voltage Vac is greater than the output voltage Vo, then the input voltage Vac is used as the biasing voltage Vb. If the output voltage Vo is greater than the input voltage Vac, then the output voltage Vo is used as the biasing voltage Vb.

At act 1010, the biasing voltage Vb is applied to a body/bulk terminal of the transistor MPR.

At act 1032, the transfer of current from the first terminal of the transistor MPR to the second terminal of the transistor MPR is regulated. For example, the current may be controlled to maintain the output voltage Vo (or, for example, an average of the output voltage Vo) at a desired DC value. In some embodiments, this may be accomplished by applying a gate voltage Vg to the gate terminal of the transistor MPR such that current flows between the first terminal and the second terminal of the transistor MPR when the voltage at the first terminal is greater than the voltage at the second terminal and the voltage at the first terminal is greater than the gate voltage Vg plus the threshold voltage of the transistor MPR. Allowing current to flow only when the voltage at the first terminal is greater than the voltage at the second terminal results in rectification of the voltage at the first terminal. Allowing current to flow only when the voltage at the first terminal is greater than the gate voltage Vg plus the threshold voltage of the transistor MPR results in regulation of the voltage at the second terminal. Accordingly, the voltage at the second terminal (for example, the output voltage Vo) is a rectified and regulated version of the voltage at the second terminal (for example, the input voltage Vac).

In some embodiments, at act 1012,750T it is determined whether the input voltage Vac is greater than the output voltage Vo and greater than the gate voltage Vg plus the threshold voltage of the transistor MPR (for example, the absolute value of the threshold voltage). If so, the method 1000 proceeds to act 1014. If not, the method 1000 proceeds to act 1016. At act 1014, the transistor MPR is turned on, therefore allowing current to flow through the transistor MPR at act 1018. At act 1016, the transistor MPR is turned off, such that no current flows through the transistor MPR at act 1020.

In some embodiments, it is determined whether the output voltage Vo is lower than (or, for example, equal to) the gate voltage Vg minus the threshold voltage of the transistor MPR. If it is, then the gate voltage Vg is prevented from decreasing further (or, for example, is maintained at its current level).

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described above could be termed a second element, component, region, layer or section, without departing from the spirit and scope of the inventive concept.

It will be understood that when an element is referred to as being "on," "connected to," or "coupled to" another element, it can be directly on, connected to, or coupled to the other element, or one or more intervening elements may be present. In addition, it will also be understood that when an element is referred to as being "between" two elements, it can be the only element between the two elements, or one or more intervening elements may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the inventive concept described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the inventive concept.

While certain embodiments of the present disclosure have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A method of rectifying and regulating an input voltage using a metal-oxide-semiconductor field-effect transistor (MOSFET), the MOSFET having a first terminal, a second terminal, a gate terminal, and a body terminal, the method comprising:
   receiving an input voltage;
   generating a biasing voltage, the biasing voltage being higher than a maximum value of the input voltage minus a forward bias voltage of a p-n junction diode;
   applying the biasing voltage to the body terminal of the MOSFET;
   applying the input voltage to the first terminal of the MOSFET; and
   regulating transfer of current from the first terminal of the MOSFET to the second terminal of the MOSFET to generate a voltage at the second terminal of the MOSFET.

2. The method of claim 1, wherein regulating transfer of current from the first terminal to the second terminal comprises allowing current to flow between the first terminal and the second terminal when the input voltage is greater than the voltage at the second terminal and the input voltage is greater than the voltage at the gate terminal plus a threshold voltage of the MOSFET.

3. The method of claim 1, wherein regulating transfer of current from the first terminal to the second terminal comprises controlling the voltage at the gate terminal such that the voltage at the second terminal corresponds with a reference voltage.

4. The method of claim 3, wherein the controlling of the voltage at the gate terminal comprises providing the voltage at the second terminal of the MOSFET to a non-inverting input of an error amplifier, providing the reference voltage to an inverting input of the error amplifier, and providing an output of the error amplifier to the gate terminal of the MOSFET.

5. The method of claim 3, wherein the controlling of the voltage at the gate terminal comprises preventing the voltage at the gate terminal from decreasing if the voltage at the second terminal is lower than the voltage at the gate terminal minus a threshold voltage of the MOSFET.

6. The method of claim 1, wherein the biasing voltage is generated from the input voltage.

7. The method of claim 1, wherein generating the biasing voltage comprises rectifying the input voltage.

8. The method of claim 7, wherein the rectifying is performed utilizing a rectifier with a voltage drop lower than the forward bias voltage of a p-n junction diode.

9. The method of claim 7, wherein the rectifying is performed utilizing a Schottky diode.

10. The method of claim 7, wherein the rectifying is performed utilizing a diode-connected NMOS transistor.

11. The method of claim 1, wherein the generating of the biasing voltage comprises utilizing the input voltage as the biasing voltage when the input voltage is greater than the voltage at the second terminal, and utilizing the voltage at the second terminal as the biasing voltage when the voltage at the second terminal is greater than the input voltage.

12. The method of claim 1, wherein regulating transfer of current from the first terminal to the second terminal is rectifying the input voltage and regulating the voltage at the second terminal.

13. A system for rectifying and regulating an input voltage comprising:
- a metal-oxide-semiconductor field-effect transistor (MOSFET) having a first terminal, a second terminal, a gate terminal, and a body terminal;
- a biasing circuit coupled to the first terminal and to the body terminal, the biasing circuit being configured to generate a biasing voltage greater than the maximum value of a voltage on the first terminal minus a forward bias voltage of a p-n junction diode and apply the biasing voltage to the body terminal; and
- a control circuit coupled to the gate terminal and the second terminal, the control circuit being configured to generate a gate voltage based on a voltage at the second terminal, and apply the gate voltage to the gate terminal to regulate transfer of current by the MOSFET from the first terminal to the second terminal.

14. The system of claim 13, wherein the control circuit generates the gate voltage such that current flows between the first terminal and the second terminal when the voltage at the first terminal is greater than the voltage at the second terminal and the voltage at the first terminal is greater than the voltage at the gate terminal plus a threshold voltage of the MOSFET.

15. The system of claim 13, wherein generating the gate voltage based on the voltage at the second terminal is generating the gate voltage such that the voltage at the second terminal has a regulated DC value.

16. The system of claim 13, wherein the control circuit comprises an error amplifier, a non-inverting input of the error amplifier is coupled to the second terminal of the MOSFET, an inverting input of the error amplifier is coupled to a reference voltage, and an output of the error amplifier is coupled to the gate terminal of the MOSFET.

17. The system of claim 16, wherein the control circuit comprises an overdrive protection transistor, a gate terminal of the overdrive protection transistor being coupled to the gate terminal of the MOSFET, a first terminal of the overdrive protection transistor being coupled to the second terminal of the MOSFET, and a second terminal of the overdrive protection transistor being coupled to the error amplifier such that if the overdrive protection transistor conducts an overdrive protection current to the error amplifier, the error amplifier will prevent the gate voltage from decreasing.

18. The system of claim 13, wherein the biasing circuit is an auxiliary rectifier configured to rectify the voltage at the first terminal.

19. The system of claim 18, wherein the auxiliary rectifier comprises a Schottky diode.

20. The system of claim 18, wherein the auxiliary rectifier comprises a diode-connected NMOS transistor.

21. The system of claim 13, wherein the biasing circuit is further coupled to the second terminal of the MOSFET, and wherein the biasing circuit is further configured to apply the higher of the voltage at the first terminal and the voltage at the second terminal to the body terminal.

22. The system of claim 13, wherein the control circuit generates the gate voltage to regulate transfer of current by the MOSFET such that the MOSFET rectifies the voltage at the first terminal and regulates the voltage at the second terminal.

* * * * *